United States Patent [19]

Bailey et al.

[11] Patent Number: 4,476,255
[45] Date of Patent: Oct. 9, 1984

[54] PHOTOREACTIVE PLASTIC COMPOSITION AND ARTICLES DEGRADABLE BY ULTRAVIOLET RADIATION AND A PROCESS FOR THEIR MANUFACTURE

[75] Inventors: William J. Bailey, College Park, Md.; Lynn J. Taylor, Haslett, Mich.

[73] Assignee: Owens-Illinois, Inc., Toledo, Ohio

[21] Appl. No.: 194,502

[22] Filed: Nov. 1, 1971

[51] Int. Cl.$^3$ .............................................. C08J 7/12
[52] U.S. Cl. .................................... 523/125; 524/358
[58] Field of Search .............................. 160/94.9 GB; 260/92.8 A; 8/39, 74, 165

[56] References Cited

U.S. PATENT DOCUMENTS

| 3,014,799 | 12/1961 | Oster | 96/35 |
| 3,299,568 | 1/1967 | Tobolsky | 47/9 |
| 3,320,695 | 5/1967 | Moore | 47/9 |
| 3,341,357 | 9/1967 | Feild | 117/138.8 |
| 3,454,510 | 7/1969 | Newland | 260/23 |
| 3,538,068 | 11/1970 | Morita | 260/94.9 |
| 3,590,528 | 7/1971 | Shepherd | 47/9 |
| 3,642,761 | 2/1972 | Ohira | 260/93.7 |
| 3,660,320 | 5/1972 | Johnson et al. | 260/928 A |

OTHER PUBLICATIONS

Chemical Abstracts vol. 68, No. 79359j *Photodegradation of Polymers III* 1968.
Chevassus–Stabilization of Polyvinylchloride 1963, pp. 23–27.
Imoto et al., Chem. Abstracts, vol. 53, p. 16582d, (1959).

*Primary Examiner*—Paul R. Michl
*Attorney, Agent, or Firm*—Myron E. Click; Thomas L. Farquer

[57] ABSTRACT

A photoreactive plastic composition degradable by ultraviolet radiation, said composition consisting essentially of a photodegradable polymer having uniformly dispersed therein about 0.01–10% by weight of at least one photosensitizer. There is also provided a process for the preparation of the photoreactive plastic composition. The photoreactive plastic compositions are useful for making plastic articles, particularly plastic packaging materials.

9 Claims, No Drawings

PHOTOREACTIVE PLASTIC COMPOSITION AND ARTICLES DEGRADABLE BY ULTRAVIOLET RADIATION AND A PROCESS FOR THEIR MANUFACTURE

BACKGROUND OF THE INVENTION

This invention relates to plastic compositions containing a photosensitizer which renders the composition degradable by ultraviolet radiation.

The advent of plastics has given rise to improved methods of packaging goods. For example, polyethylene and polypropylene plastic films, bags, bottles, styrofoam cups and blister packages have the advantages of being chemically resistant, relatively unbreakable, light in weight and translucent or transparent. The increasing use of plastics in packaging applications has created a serious waste disposal problem Burning of these plastic materials is unsatisfactory since it adds to air pollution problems.

Unlike some other packaging materials, such as paper and cardboard, plastics are not readily destroyed by the elements of nature. Thus, burying them is not an effective means of disposal, and can be expensive.

Plastics are biologically recent developments, and hence are not easily degradable by micro-organisms which attack most other forms of organic matter and return them to the biological life cycle. It has been estimated that it may take millions of years for organisms to evolve which are capable of performing this function. In the meantime, plastic containers and packaging films are beginning to litter the countryside after being discarded by careless individuals.

One means suggested for combating the plastic waste disposal problem has been the use of plastic compositions which degrade upon exposure to ultraviolet light. Plastics are made up of large molecules, the atoms of which are linked together to form chains. It has been suggested to introduce a "sensitizer group" along the polymer chain which would absorb the ultraviolet light of the sun and, using this energy, break the polymer chain. When the chains are broken, the plastic loses its physical strength and becomes brittle, so that it is easily broken apart by natural erosion of the wind, waves, or rain into small particles which become part of the soil.

The sensitizer groups in previously known compositions, are chemically bonded to other atoms in the polymer chain. The introduction of these sensitizer groups into the polymer chain can be complicated, and requires precise control in order to obtain the proper sensitizer concentration. Thus, there has been a need for a plastic composition degradable by ultraviolet light which can more easily be prepared.

SUMMARY OF THE INVENTION

According to this invention there is provided a photoreactive plastic composition degradable by ultraviolet radiation consisting essentially of a photodegradable polymer having uniformly dispersed therein about 0.01-10% by weight of at least one photosensitizer.

There is also provided an article of manufacture degradable by ultraviolet radiation, and consisting essentially of a photoreactive plastic composition of a degradable polymer having uniformly dispersed therein about 0.01-10% by weight of at least one photosensitizer.

This invention also provides a process for the preparation of a photoreactive plastic composition degradable by ultraviolet radiation, said process consisting essentially of melting a solid photodegradable polymer at a temperature below the decomposition temperature of the polymer, adding about 0.01-10% by weight of at least one photosensitizer to the resulting molten polymer, and mixing the photosensitizer with the molten polymer at a temperature below the decomposition temperature of the photosensitizer to obtain a substantially uniform mixture.

The invention further provides a process for the preparation of a photoreactive plastic composition degradable by ultraviolet radiation, said process consisting essentially of blending about 0.1-10% by weight of at least one photosensitizer with a solid photodegradable polymer to obtain a substantially uniform mixture.

There is also provided a process for the preparation of a photoreactive plastic composition degradable by ultraviolet radiation, said process consisting essentially of casting a film from a composition of a photodegradable polymer and about 0.01-10% by weight of at least one photosensitizer in an inert solvent.

Use of the plastic compositions of this invention will aid in alleviating the problem of plastic waste disposal. Upon exposure to ultraviolet radiation from sunlight or from artifical sources, the photosensitizer initiates the photooxidation of the polymer, thus accelerating the chemical and mechanical deterioration of the article. This deterioration in turn facilitates waste disposal by permitting the plastic to be crushed, pulverized or subjected to biological degradation more readily than would otherwise be true. In the case of a glass-plastic composite, the deterioration would facilitate the separation of the glass and plastic components for disposal or recovery. The method of preparing the plastic compositions of this invention is relatively simple since the photosensitizer need not be chemically bonded to the polymer chain The compositions of this invention are particularly useful as packaging materials.

DESCRIPTION OF THE INVENTION

The plastic composition of this invention consists essentially of a polymer having uniformly dispersed therein a photosensitizer. The term "consisting essentially of" has its generally accepted meaning as requiring that specified components be present, but not excluding other components which do not materially detract from the basic and novel characteristics of the composition or article as disclosed.

The term "photoreactive" as used herein means that a chemical reaction occurs in the plastic composition under the influence of light. The spectrum of light which causes this chemical reaction is ultraviolet. Ultraviolet light occurs in that portion of the electromagnetic spectrum that begins at the end of the violet portion of the visible spectrum, at a wave length of about 3900-4000 Angstrom units, and consists of the radiations of decreasing wave length extending down toward the X-ray region to a wave length of about 200 Angstrom units.

The novel compositions of this invention are plastic, that is, they are materials which contain as an essential ingredient an organic substance of high molecular weight. The materials are solid in a finished state, and, at some stage of manufacture or processing into finished articles, can be shaped by flow. (See ASTM D883-54T).

The degradation process employed in this invention is believed to be a free-radical chain reaction. The key steps are (1) the formation of reactive free radicals, (2) attack of such radicals on the polymer molecule, leading to the abstraction of hydrogen atoms and the formation of polymer radicals, (3) reaction of the polymer radicals with atmospheric oxygen, yielding polymeric peroxy radicals, (4) reaction of these polymeric peroxy radicals with other polymer molecules or other portions of their own molecule, yielding polymer hydroperoxide and other polymer radicals (which, in turn, can undergo steps 3 and 4), and (5) subsequent decomposition reactions of the polymer hydroperoxide, also involving the formation of free radicals and leading to cleavage of the polymer chain. The detailed mechanism of initiation steps (1) and (2) is believed to vary from sensitizer to sensitizer In some cases (e.g., organic peroxides) it is likely that the sensitizer itself decomposes to yield free radicals. In other cases (e.g., ketones and dyes), a photochemically excited state of the sensitizer may abstract hydrogen atoms from the polymer, or may transfer energy to the oxygen molecule to yield an excited molecule of "singlet oxygen", which in turn attacks the polymer. The term "singlet oxygen" is used by photo chemists to indicate a molecule of oxygen in an electronically excited state.

The polymer or copolymer is one which can be degraded by accelerated photodegradation. Most organic polymers display some sensitivity to photo-oxidative degradation. Thus, organic polymers and copolymers having hydrogen bonded to carbon can be used in this invention. Typical of the polymers and copolymers which can be used are: polyethylene, polypropylene, poly (1-butene), poly(4-methyl-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly(vinylidene chloride), polyvinyl fluoride, poly(vinylidene fluoride), polyoxymethylene, poly(ethylene oxide), poly(propylene oxide), polyvinyl alcohol, polyvinyl acetate, polyvinyl formal, polyvinyl butyral, poly (methyl acrylate), poly(ethyl acrylate), poly(caprolactam), poly(hexamethyleneadipamide), poly(ethylene terephthalate), vinyl chloride - vinyl acetate copolymers, styrene-butadiene copolymers, styrene-isoprene copolymers, cellulose acetate, cellulose propionate, cellulose acetate butyrate, ethyl cellulose, methyl cellulose, hydroxyethyl cellulose, and hydroxypropyl cellulose. Polyolefin polymers are preferred. Particularly preferred are polyethylene, polypropylene, poly(4-methyl-1-pentene), polystyrene and polyvinylchloride.

The plastic composition of this invention is made photoreactive by uniformly dispersing therein about 0.01–10% by weight of a photosensitizer, preferably about 0.1–5% by weight. It is particularly preferred to use about 0.1–2% by weight. As used herein the term "photosensitizer" is to be given a broad interpretation, and is intended to describe inorganic and organic compounds and compositions which become photoreactive upon exposure to light in the ultraviolet spectrum. The term is also intended to include "latent sensitizers", that is, organic and inorganic compounds and compositions which are precursors of photosensitizers, and which become photosensitive upon exposure to natural elements such as air, water, heat or light. Once these latent sensitizers become photosensitive, photoreaction can occur upon exposure to ultraviolet radiation.

The photosensitizers useful in this invention are those compounds and compositions known to promote photo-oxidation, photo-polymerization, photocrosslinking, etc. reactions.

Typical of the photosensitizers are aliphatic and aromatic ketones, for example: acetophenone, acetoin, 1'-acetonaphthone, 2'-acetonaphtone, anisoin, anthrone, bianthrone, benzil, benzoin, benzoin methyl ether, benzoin isopropyl ether, 1-decalone, 2-decalone, benzophenone, p-chlorobenzophenone, dibenzalacetone, benzoylacetone, benzylacetone, deoxybenzoin, 2,4-dimethylbenzophenone, 2,5-dimethylbenzophenone, 3,4-dimethylbenzophenone, 4-benzoylbiphenyl, butyrophenone, 9-fluorenone, 4,4-bis-(dimethylamino)-benzophenone, 4-dimethylaminobenzophenone, dibenzyl ketone, 4-methylbenzophenone, propiophenone, benzanthrone, 1-tetralone, 2-tetralone, valerophenone, 4-nitrobenzophenone, di-n-hexyl ketone, isophorone, and xanthone.

Aromatic ketones are preferred. Particularly preferred are benzophenone, benzoin, anthrone and deoxyanisoin.

Also useful as photosensitizers are quinones, for example: anthraquinone, 1-aminoanthraquinone, 2-aminoanthraquinone, 1-chloroanthraquinone, 2-chloroanthraquinone, 1-methylanthraquinone, 2-methylanthraquinone, 1-nitroanthraquinone, 2-phenylanthraquinone, 1,2-naphthoquinone, 1,4-naphthoquinone, 2-methyl-1,4-naphthoquinone, 1,2-benzanthraquinone, 2,3-benzanthraquinone, phenanthrenequinone, 1-methoxyanthraquinone, 1,5-dichloroanthraquinone, and 2,2'-dimethyl-1,1'-dianthraquinone, and anthraquinone dyes. Preferred quinones are 2-methylanthraquinone, 2-chloroanthraquinone and 2-ethylanthraquinone.

Peroxides and hydroperoxides can be used. Typical of these compounds are: tert-butyl hydroperoxide, cumene hydroperoxide, diisopropylbenzene hydroperoxide, 2,5-dimethylhexane-2,5-dihydroperoxide, p-menthane hydroperoxide; 1,1,3,3-tetramethylbutyl hydroperoxide, acetyl peroxide, benzoyl peroxide, p-chlorobenzoyl peroxide, 2,4-dichlorobenzoyl peroxide, ditoluoyl peroxide, decanoyl peroxide, lauroyl peroxide, isobutyryl peroxide, diisononanoyl peroxide, perlargonyl peroxide, tert-butyl peroxyacetate, tert-butyl peroxymaleic acid, tert-butyl peroxyisobutyrate, tert-butyl peroxypivalate, tert-butyl peroxybenzoate, tert-butyl peroxycrotonate, tert-butyl peroxy-(2-ethylhexanoate), 2,5-dimethyl-2,5-bis-(2-ethylhexanoylperoxy) hexane, 2,5-dimethyl-2,5-bis-(benzoylperoxy) hexane, 2,5-dimethyl-2,5-bis-(tert-butylperoxy) hexane, 2,5-dimethyl-2,5-bis-(tert-butylperoxy)-hexyne-3, di-tert-butyl diperoxyphthalate, 1,1,3,3-tetramethylbutylperoxy2-ethyl-hexanoate, di-tert-butyl peroxide, di-tert-amyl peroxide, tert-amyl-tert-butyl peroxide, 1,1-di-tert-butylperoxy-3,3,5-trimethyl cyclohexane, bis-(tert-butylperoxy)-diisopropylbenzene, n-butyl-4,4-bis-(tert-butylperoxy)valerate, dicumyl peroxide, acetyl acetone peroxide, methyl ethyl ketone peroxide, cyclohexanone peroxide, tert-butylperoxy isopropyl carbonate, 2,2-bis-(tert-butylperoxy)butane, di-(2-ethylhexyl)peroxydicarbonate, and bis-(4-tert-butylcyclohexyl)peroxydicarbonate.

Preferred compounds are benzoyl peroxide, dicumyl peroxide, dilauroyl peroxide, 2,5-dimethyl-2,5-di(t-butylperoxy) hexyne-3, and $\alpha,\alpha'$-bis (t-butylperoxy) diisopropylbenzene. Peroxides and hydroperoxides are generally thermally unstable. Consequently, care must be exercised in combining the photosensitizer with the copolymer. Processing should be conducted at a temperature below the decomposition temperature of the photosensitizer.

Still other compounds which can be used as the photosensitizer are azo compounds. Typical of the useful compounds are: 2-azo-bis-isobutyronitrile, 2-azo-bis-propionitrile, dimethyl-2-azo-bis-isobutyrate, 1-azo-bis-1-cyclohexanecarbonitrile, 2-azo-bis-2-methylheptanitrile, 2-azo-bis-2-methylbutyronitrile, 4-azo-bis-4-cyanopentanoic acid, azodicarbonamide, azobenzene, and azo dyes.

Organic dyes known to promote photoreactions are particularly useful in this invention. Among the preferred dyes are:

|  | C. I. Reference |
|---|---|
| Acetosol Red BLS | C. I. solvent red 90 |
| Acridine Orange Base | C. I. solvent orange 15 |
| Acridine Yellow |  |
| Chlorazol Black E | C. I. direct black 38 |
| Eosin Y | C. I. acid red 87 |
| Phenazo Brilliant Scarlet R.O. |  |
| Rhodamine B Base |  |

Acridine yellow is a compound of the formula:

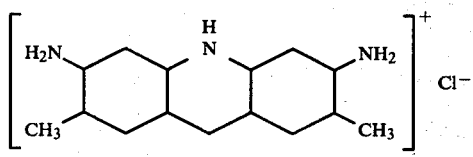

and Rhodamine B Base is a compound of the formula:

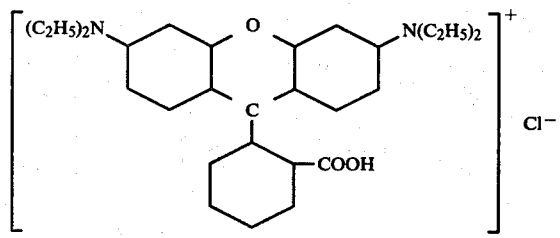

Preferred latent sensitizers previously referred to are: benzhydrol, bis(α-methylbenzyl ether, dibenzyl ether, linoleic acid, 4,4', 4"-methylidynetris(N,N-dimethylaniline) (a "latent dye"), polyethyleneglycol dioleate, and tung oil.

Other photosensitizers will be apparent to those skilled in the art. Among these are: aromatic hydrocarbons such as, naphthalene, anthracene, phenanthrene, and 1-phenyldecane; aromatic nitro compounds such as, nitrobenzene, p-nitroanisole, 4-nitrobiphenyl, p-nitroaniline, and 2,4,6-trinitroaniline; aldehydes, for example, 2-ethylhexanal, tetradecyl aldehyde, phenylacetaldehyde, benzaldehyde, p-anisaldehyde, 4-benzyloxybenzaldehyde, 3,4-dibenzyloxybenzaldehyde, p-n-octyloxybenzaldehyde, 1-naphthaldehyde, 2-naphthaldehyde, and 9-anthraldehyde; organic sulfur compounds, for example, diphenyl disulfide, dibenzyl disulfide, dibenzoyl disulfide, dilauroyl disulfide, 1-naphthalenethiol, diisopropylbenzene thiol, 2-mercaptobenzothiazole, 2-mercaptobenzimidazole, tetramethylthiuram monosulfide, tetramethylthiuram disulfide, ethyl-2-benzothiazylsulfonate, and p-toluenesulfonyl chloride; organic halogen compounds such as, chlorinated paraffins, chlorinated biphenyls and polyphenyls, chlorinated toluenes, xylenes, etc., benzyl chloride, 3,4-dimethylbenzyl chloride, benzyhydryl chloride, benzal chloride, benzotrichloride, chlorinated naphthalenes, 1-chloromethylnaphthalene, tetrachlorotetrahydronaphthalene, phenacyl chloride, phenacyl bromide, and styrene dibromide; aryl amines such as, aniline, N,N-diethyl aniline, diphenylamine, triphenylamine, 1-naphthylamine, 2-naphthylamine, p,p'-benzylidenebis(N,N-dimethylaniline), p,p',p"-triaminotriphenylmethane, p,p',p"-triaminotriphenyl carbinol, and 4,4'-diaminobiphenyl.

Still other photosensitizers can be found in the following references: J. Kosar, "Light-Sensitive Systems", John Wiley & Sons, New York, 1965, Chapters 4 ("Unsaturated Compounds"), 5 ("Photopolymerization Processes") and 8 ("Photochemical Formation and Destruction of Dyes"); G. Otter and N.-L. Yang, "Photopolymerization of Vinyl Monomers," Chem. Revs. 68, 125-151 (1968); J. F Rabek, "Photosensitized Processes in Polymer Chemistry: A Review," Photochem. Photobiol, 7, 5-57 (1968); G. Delzenne, "Sensitizers of Photopolymerization," Ind. Chim. Belge 24, 739-764 (1959); C. M. McCloskey and J. Bond, "Photosensitizers for Polyestervinyl Polymerization," Ind. Eng. Chem. 47, 2125-2129 (1955); O. L. Mageli and J. R. Kolczynski. "Organic Peroxides," Ind. Eng. Chem. 58, 25-32 (Mar. 1966); D. Swern, "Organic Peroxides", Vol. I, Wiley-Interscience, New York, 1970; E. Gurr, "Synthetic Dyes in Biology, Medicine, and Chemistry," Academic Press, New York, 1971; G. I. Hass, R. W. Bassemir, and D. J. Carlick, Sun Chemical Corp., "Radiation-Curable Compositions," U.S. Pat. No. 3,551,311, Dec. 29, 1970.

Combinations of two or more of the aforementioned additives can also be used. Besides the immediately apparent possibility of using a mixture of photosensitizers which act in the same manner, two or more additives capable of accelerating different steps in the degradation mechanism can also be advantageously employed. For example, one might use a photosensitizer in combination with a material such as an aliphatic tertiary amine) capable of accelerating the decomposition of hydroperoxide groups. Or one might use a photosensitizer in combination with a compound which is easily oxidized to a ketone or hydroperoxide.

Polymers differ in their sensitivity to accelerated photo-degradation. For example, some polyolefins, such as polypropylene and poly-4-methyl-pentene, and oxygenated polymers, such as polyoxymethylene, polyethers, polyvinyl formal polyvinyl butyral, etc. can be expected to be relatively sensitive to photodegradation. It will be apparent that a concentration of photosensitizer at the lower end of the claimed range will be used for normal photodegradation of such polymers. It will also be apparent that concentrations in the upper end of the claimed range can also be used if relatively rapid degradation of the plastic composition is desired.

The time required for articles made from the plastic composition of this invention to weaken and finally decompose depends upon the rate of degradation. This rate is dependent upon the concentration of photosensitizer in the plastic composition, the intensity of the ultraviolet radiation, the dimensions and shape of the article, and the properties of the plastic. These factors can be varied to obtain a desired rate of degradation for a particular application. One skilled in the art can readily determine with a minimum of experimentation the amount of photosensitizer to be used with a particular polymer for a particular application.

Generally, natural sunlight will be used to initiate the photodegradation of the novel plastic compositions of this invention; however, artificial sources of ultraviolet light can also be used. Use of an artificial source of light may be particularly advantageous when followed by disposal of the plastic composition. For example, intentional exposure of a plastic composition to an artifical source of ultraviolet light may initiate a photodegradation reaction in the composition which would then continue after waste disposal, such as by burial.

The microbial degradation of polymers is generally slow because the polymers and copolymers are so large and so insoluble that the organism cannot attack it at any appreciable rate. As soon as degradation takes place with the reduction in molecular weight and the introduction of functional groups, such as terminal carboxylic acid groups, the micro-organism can degrade it so that the critical point in the degradation of the polymer is to reduce the molecular weight and increase functional groups as well as destroying the form of the article. From then on the biological degradation would proceed normally.

The novel photoreactive plastic compositions can also contain non-reactive additives By the term "non-reactive additives" is meant a chemical additive, filler, or reinforcement commonly used in the formulation of plastic compositions, and which does not react with the photosensitizer, or materially interfere with the photodegradation process. For example, the compositions of this invention can contain additives and processing aids, viscosity depressants, mold-release agents, emulsifiers, and slip agents. The composition of this invention can also contain anti-oxidants, anti-static agents, and fibrous reinforcement which do not materially detract from the degradation of the composition upon exposure to ultraviolet light. The compositions of this invention can also contain fillers, such as barium sulphate, calcium carbonate, calcium silicate, fumed colloidal silica, glass, and clay. Flame retardants, lubricants, plasticizers, adhesion promoters and stabilizers, such as those used to prevent thermooxidative decomposition can also be used. The additive is generally one which does not detract from the degradation of the novel plastic compositions on exposure to ultraviolet light. In some cases, it may be necessary to add an antioxidant or stabilizer to permit high-temperature processing, even though that additive may slow photodegradation. In other cases, it may be desirable to retard photodegradation for a limited period of time.

The novel plastic compositions of this invention can be made by a number of methods. A preferred method consists essentially of heating a photodegradable polymer at a temperature below the decomposition temperature of the polymer, adding about 0.01–10% by weight of a photosensitizer to the resulting molten polymer, and mixing the photosensitizer with the molten polymer at a temperature below the decomposition temperature of the photosensitizer to obtain a substantially uniform mixture. The mixture can then be molded and cooled to form a solid molded article. In the alternative, the mixture can be extruded and cooled to form a solid extrudate. Conventional plastic processing equipment can be used for melting the polymer, mixing the polymer with the photosensitizer, and molding or extruding the resulting mixture processing conditions, such as temperature, time, and pressure will be obvious to those skilled in the art.

Another preferred process for preparing the novel plastic compositions of this invention consists essentially of blending about 0.01–10% by weight of at least one photosensitizer with a solid degradable polymer to obtain a substantially uniform mixture. The polymer is preferably in the form of pellets, granules or powder. Conventional plastic processing equipment can be used in the blending operation. The processing conditions will be obvious to those skilled in the art. The resulting mixture can be melted at a temperature below the decomposition temperature of the polymer and photosensitizer. The resulting melt can be extruded or molded and cooled to form a solid extrudate or molded article.

The novel plastic compositions of this invention can be prepared at the time of disposal of conventional plastic articles. For example, a plastic article can be crushed, milled or ground, and subsequently mixed with a photosensitizer to form a photoreactive plastic composition. The plastic composition can then be exposed to sunlight or an artificial source of ultraviolet light to initiate the photodegradation reaction.

A preferred process for preparing the novel plastic compositions of this invention consists essentially of casting a film from a composition of the photosensitizer and a polymer in an inert solvent. By "inert solvent" is meant that the solvent does not react with the polymer or photosensitizer. The photosensitizer is present in an amount about 0.01–10% by weight. Use of this method will be more clearly understood by reference to the examples contained hereinafter.

The photosensitizer can also be applied as a solution, slurry, or paste to the surface of a plastic article. The sensitizer can be applied by brushing, roller coating, spraying, dipping or printing on the surface of the article.

A composite container in which the polymer and photosensitizer are present in adjacent layers can also be constructed.

This invention will be more clearly understood by reference to the following examples. All parts, proportions and percentages are by weight unless otherwise indicated.

EXAMPLE 1–Polyolefin Containing A Quinone

A polypropylene film containing 2% by weight of 2-methylanthraquinone is prepared by casting from a solution of unstabilized polypropylene (Profax 6401) and 2-methylanthraquinone in warm xylene. The film having a thickness of about 0.003 inch, is exposed in air to the radiation from an 8-watt tubular UV source, emitting radiation principally of 254 millimicrons wave length. After 96 hours exposure, extensive photo-oxidative degradation of the film is indicated by the appearance of a strong carbonyl-group band at 5.8 microns in the infrared spectrum. The film splits when it is bent around a metal rod of 1-inch diameter, indicating mechanical embrittlement.

EXAMPLE 2–Polyolefin Containing A Ketone

A polypropylene film containing 2% by weight of benzophenone is prepared by casting from a solution of unstabilized polypropylene (Profax 6401) and benzophenone in warm chlorobenzene. The resulting film, thickness of about 0.0035 inch, is exposed in air for 97 hours to radiation from an 8-watt tubular UV source, emitting radiation principally of 360 millimicrons wave length. The exposed film splits when it is bent around a metal rod of ¼-inch diameter. An additive-free polypropylene film, prepared and exposed in the same manner, fails to split when it is bent around the same metal rod.

EXAMPLE 3–Polyolefin Containing Photosensitizer

Polypropylene films containing 1% to 5% by weight of various photosensitizers are prepared by solution casting as described in Examples 1 and 2. Each film is exposed for 48 hours in air to the radiation from an 8-watt tubular UV source emitting radiation principally at 254 millimicrons wave length. The degree of photooxidative degradation is ascertained from the intensity of carbonyl-group absorption (at about 5.8 microns) in the infrared spectrum. In the case of the following photosensitizers, the degree of degradation is found to be much greater than that obtained when an additive-free polypropylene film is treated in the same manner: anthrone, benzoin, benzophenone, benzoyl peroxide, dicumyl peroxide, $\alpha,\alpha'$-bis-(tert-butylperoxy)-diisoproyyl-benzene, 2,5-dimethyl-2,5-di-(tert-butylperoxy)-hexyne-3, linoleic acid, tung oil, polyethyleneglycol dioleate, dibenzyl ether, bis-($\alpha$-methylbenzyl) ether, and Eosin Y.

EXAMPLE 4–Polypropylene Containing 2-methylanthraquinone

Finely powdered polypropylene (Profax 6401, 47.5 g.) and 2-methylanthraquinone (2.5 g.) were weighed into a glass jar. The two materials were mixed thoroughly by continuous rotation (ball mill) of the jar for a period of 66 hrs. A film, thickness of about 0.001 inch, was prepared by compression molding of a portion of the mixture. The film was exposed for 24 hrs. to radiation from a group of four 1.4-watt circular UV lamps, emitting radiation principally of 305 millimicrons wave length. Accelerated degradation, relative to that observed in the case of a similarly prepared unsensitized sample, was indicated by infrared analysis and mechanical embrittlement.

EXAMPLE 5–Polypropylene Containing 2-chloroanthraquinone

An intimate mixture of 47.5 g. polypropylene (Profax 6401) and 2.5 g. 2-chloroanthraquinone was prepared in the manner described in Example 4. A film, thickness of about 0.002 inch, was prepared by compression molding. The film was exposed for 24 hrs. to radiation from a group of four 1.4-watt circular UV lamps, emitting radiation principally of 305 millimicrons wave length. Accelerated degradation was indicated by infrared analysis and mechanical embrittlement.

EXAMPLE 6–Polyethylene Containing Fluorenone

A composition consisting of 98% by weight of polyethylene and 2% of 9-fluorenone was prepared by melting the polymer, then blending in the additive on a two-roll mill. A portion of the resulting sheet was pressed to obtain a film of thickness 0.002 inch. This film was exposed for 24 hrs. to radiation from a circular UV source, emitting radiation principally of 254 millimicrons wave length (intensity about 2400 microwatts per square cm.). Accelerated degradation was indicated by infrared analysis.

As previously noted, it is easier to incorporate the photosensitizer into the photodegradable polymer according to the process of this invention than to chemically attach sensitizing groups to a polymer chain as was done in the prior art. This invention provides additional advantages. First, the use of a photosensitizer permits the use of various ratios of photosensitizers to photodegradable polymers, and the use of combinations of photosensitizers in order to control the rate of degradation, and to permit formulation of different compositions for different applications. Second, the chemical structure of the photodegradable polymer is not altered by the use of a photosensitizer according to this invention. Thus, changes in the physical properties, e.g. permeability, etc. of the photodegradable polymer are minimized. Third, the photodegradable polymer and photosensitizer can be stored separately, so that the photosensitizer has no opportunity to promote degradation of the polymer before converting the polymer into an article of manufacture. Fourth, additives which improve polymer properties, but which would otherwise interfere with a polymerization process, can still be used.

We claim:

1. A plastic composition degradable by ultraviolet radiation between about 200 and 400 angstroms, said composition consisting essentially of a photodegradable polyvinyl chloride having uniformly dispersed therein about 0.01–10 percent by weight of a substituted anthraquinone photosensitizer selected from the group consisting of 2-methylanthraquinone and 2-ethylanthraquinone.

2. The plastic composition of claim 1 having uniformly dispersed therein about 0.1–5% by weight of said substituted anthroquinone.

3. The plastic composition of claim 1 having uniformly dispersed therein about 0.1–2% by weight of said substituted anthraquinone.

4. An improved process for degrading a photodegradable polyvinyl chloride polymer comprising uniformly dispersing in said polyvinyl chloride polymer about 0.01–10 percent by weight of a substituted anthraquinone selected from the group consisting of 2-methylanthraquinone and 2-ethylanthraquinone and subjecting the resultant dispersion to ultraviolet radiation between about 200 and 400 angstroms.

5. The process of claim 4 consisting essentially of melting said polyvinyl chloride polymer at a temperature below the decomposition temperature of the polyvinyl chloride, adding said substituted anthraquinone photosensitizer to the resulting molten polyvinyl chloride polymer, and mixing the substituted anthraquinone photosensitizer with the molten polyvinyl chloride polymer at a temperature below the decomposition temperature of the substituted anthraquinone photosensitizer to obtain a substantially uniform mixture.

6. The process of claim 4 consisting essentially of blending said substituted anthraquinone photosensitizer with said polyvinyl chloride polymer to obtain a substantially uniform mixture.

7. the process of claim 4 consisting essentially of casting a film from said mixture of polyvinyl chloride polymer and substituted anthraquinone photosensitizer in an inert solvent.

8. The process of claim 4 wherein 0.1–5% by weight of said substituted anthraquinone is dispersed in said polyvinyl chloride polymer.

9. The process of claim 4 wherein 0.1–2% by weight of said substituted anthraquinone is dispersed in said polyvinyl chloride polymer.

* * * * *